US012518660B1

(12) United States Patent
Suarez

(10) Patent No.: US 12,518,660 B1
(45) Date of Patent: Jan. 6, 2026

(54) CONCRETE STRUCTURE WITH EMBEDDED AESTHETIC FEATURES

(71) Applicant: Silvino Michael Suarez, Los Lunas, NM (US)

(72) Inventor: Silvino Michael Suarez, Los Lunas, NM (US)

(*) Notice: Subject to any disclaimer, the term of this patent is extended or adjusted under 35 U.S.C. 154(b) by 1058 days.

(21) Appl. No.: 17/550,237

(22) Filed: Dec. 14, 2021

Related U.S. Application Data

(60) Provisional application No. 63/128,666, filed on Dec. 21, 2020.

(51) Int. Cl.
*G09F 13/02* (2006.01)
*G09F 13/04* (2006.01)
*G09F 13/22* (2006.01)
*G09F 7/18* (2006.01)

(52) U.S. Cl.
CPC .............. *G09F 13/02* (2013.01); *G09F 13/04* (2013.01); *G09F 13/22* (2013.01); *G09F 7/18* (2013.01); *G09F 2007/1878* (2013.01); *G09F 13/0472* (2021.05)

(58) Field of Classification Search
CPC . E04F 13/0862; E04F 13/147; E04F 13/0871; E04F 13/14; E04F 13/185; E04F 13/0873; E04F 13/0885; G09F 7/18; G09F 13/0472; G09F 2007/1878; G09F 13/02; G09F 13/04; G09F 13/22
See application file for complete search history.

(56) References Cited

U.S. PATENT DOCUMENTS

| | | | | |
|---|---|---|---|---|
| 2,005,030 | A | 6/1935 | Geisinger | 72/19 |
| 3,131,514 | A | 5/1964 | Siek | 50/272 |
| 3,231,646 | A | 1/1966 | Conder et al. | 264/86 |
| 3,425,105 | A | 2/1969 | Gulde | B28B 1/16 |
| 3,594,968 | A | 7/1971 | Johnson | E04D 13/08 |
| 3,689,626 | A | 9/1972 | Scott | B28B 1/14 |
| 3,874,140 | A | 4/1975 | Seehusen | B44F 9/04 |
| 5,667,190 | A | 9/1997 | Scott et al. | B22D 19/04 |
| 5,741,061 | A | 4/1998 | Lehmann et al. | F21V 31/00 |
| 5,900,180 | A | 5/1999 | Scott et al. | B28B 7/34 |
| 5,951,154 | A | 9/1999 | Carel et al. | F21S 1/10 |
| 6,041,567 | A * | 3/2000 | Passeno | E04G 9/10<br>52/749.11 |
| 6,257,865 | B1 | 7/2001 | Rondeau | B28B 5/00 |
| 6,709,717 | B2 | 3/2004 | Mushovic | C08F 2/38 |
| 6,729,094 | B1 | 5/2004 | Spencer et al. | E04B 5/18 |

(Continued)

FOREIGN PATENT DOCUMENTS

| | | | |
|---|---|---|---|
| CA | 3010868 | 4/2017 | E04F 13/09 |
| WO | WO 97/04903 | 2/1997 | B22D 19/04 |
| WO | WO 2011/119014 | 9/2011 | E04C 2/06 |

*Primary Examiner* — Patrick J Maestri
(74) *Attorney, Agent, or Firm* — HAYES SOLOWAY P.C.

(57) ABSTRACT

A system and related methods for concrete with an embedded aesthetic element includes a concrete structure having at least one surface with at least one molded shape. An aesthetic element is formed from a plastic material. The aesthetic element is at least partially embedded within the at least one molded shape of the concrete structure. The aesthetic element has at least one of: a color, a texture, a lighting, a visual appearance, or a textual appearance which differs from the concrete structure. At least one fastening device is connected between the aesthetic element and the concrete structure.

10 Claims, 19 Drawing Sheets

(56) References Cited

U.S. PATENT DOCUMENTS

| | | | | |
|---|---|---|---|---|
| 7,393,116 | B1 | 7/2008 | Holmes | F21W 121/00 |
| 7,862,754 | B2 | 1/2011 | Ciccarello | B28B 3/06 |
| 7,914,166 | B2 | 3/2011 | MacAlister | F21V 33/00 |
| 8,844,227 | B1 | 9/2014 | Ciuperca | E04C 1/00 |
| 9,689,169 | B2 * | 6/2017 | Nelson | F21V 33/006 |
| 10,544,553 | B1 * | 1/2020 | Gamez | E01F 9/559 |
| 10,709,072 | B2 | 7/2020 | Ryan et al. | A01G 9/02 |
| 10,738,991 | B2 | 8/2020 | Wang | F21V 33/00 |
| 2002/0006313 | A1 * | 1/2002 | Pas | E01F 9/20<br>404/9 |
| 2009/0034244 | A1 | 2/2009 | Tabarelli De Fatis | F21V 33/00 |
| 2010/0141156 | A1 | 6/2010 | Canino et al. | H05B 37/02 |
| 2013/0014459 | A1 * | 1/2013 | Elwell | E04B 1/7076<br>52/302.1 |
| 2014/0272302 | A1 | 9/2014 | Ciuperca | E04C 2/04 |
| 2015/0360389 | A1 | 12/2015 | Scherer | B28B 7/00 |
| 2021/0040272 | A1 | 2/2021 | Brakin et al. | C08J 3/075 |

* cited by examiner

50

10

CONCRETE STRUCTURE WITH EMBEDDED AESTHETIC FEATURES

CROSS REFERENCE TO RELATED APPLICATION

This application claims benefit of U.S. Provisional Application Ser. No. 63/128,666 entitled, "Concrete Structure with Embedded Aesthetic Features" filed Dec. 21, 2020, the entire disclosure of which is incorporated herein by reference.

FIELD OF THE DISCLOSURE

The present disclosure is generally related to concrete structures and more particularly is related to concrete structures with embedded aesthetic features.

BACKGROUND OF THE DISCLOSURE

Concrete is one of the most commonly used building materials in modern times. Concrete is routinely used for manufacturing various structures, including bridges, retaining walls, fences, buildings, parking garages, roadways, and others. Concrete-based materials, such as stucco, cement fiber board, and veneers are also often used as an exterior coating on houses and other buildings. Since concrete is very durable and strong in most applications, and it is usually affordable, it has a broad appeal as a building material.

Standard concrete is often a gray color and has the appearance of the mold or form in which the concrete is cast. However, when concrete is used as a building material, it is often desirable to add an aesthetic appearance to the visible surface of the concrete. This may include dyeing the concrete a specific color, treating the concrete to expose decorative aggregate prior to the concrete curing, or adding texture, shapes, designs, or other features by molding the concrete while it is curing. As one example, bridges and overpasses are often formed from concrete which has a molded and/or colored exterior surface which gives the structure a decorative appearance. While these decorative treatments to concrete are widely used, after they are made, there is little ability to change the decorative elements in concrete. As such, decorations may become outdated or be unable to be updated with changing times.

Thus, a heretofore unaddressed need exists in the industry to address the aforementioned deficiencies and inadequacies.

SUMMARY OF THE DISCLOSURE

Embodiments of the present disclosure provide a system and method for embedded concrete with an aesthetic element. Briefly described, in architecture, one embodiment of the system, among others, can be implemented as follows. A system for embedded concrete with an aesthetic element includes a concrete structure having at least one surface with at least one molded shape. An aesthetic element is formed and/or 3D printed from a plastic material. The aesthetic element is at least partially embedded within the at least one molded shape of the concrete structure. The aesthetic element has at least one of: a color, a texture, a lighting, a visual appearance, or a textual appearance which differs from the concrete structure. At least one fastening device is connected between the aesthetic element and the concrete structure.

The present disclosure can also be viewed as providing a system for embedded concrete with an aesthetic element.

Briefly described, in architecture, one embodiment of the system, among others, can be implemented as follows. A concrete structure has at least one surface with a plurality of molded shapes. The plurality of molded shapes is positioned inset from the at least one surface, extending into the concrete structure. At least two aesthetic elements are formed from a plastic material. A first of the at least two aesthetic elements is at least partially embedded within one of the plurality of molded shapes in the concrete structure, and a second of the at least two aesthetic elements is positioned on the at least one surface of the concrete structure. The second of the at least two aesthetic elements is positioned further outermost from the first of the at least two aesthetic elements. Both of the first and second aesthetic elements have at least one of: a color, a texture, a lighting, a visual appearance, or a textual appearance which differs from the concrete structure. At least one fastening device is connected between each of the first and second aesthetic elements, respectively, and the concrete structure.

The present disclosure can also be viewed as providing methods of manufacturing a concrete structure with an aesthetic element. In this regard, one embodiment of such a method, among others, can be broadly summarized by the following steps: casting a quantity of concrete within a concrete form, wherein prior to curing the quantity of concrete within the concrete form, at least one mold is used to create at least one inset, molded shape within the quantity of concrete; curing the quantity of concrete to form a concrete structure; removing the at least one mold from the concrete structure; and installing at least one aesthetic element formed from a plastic material within the at least one inset, molded shape formed within the concrete structure, wherein the aesthetic element is at least partially embedded within the at least one inset, molded shape of the concrete structure, wherein the aesthetic element has at least one of: a color, a texture, a visual appearance, or a textual appearance which differs from the concrete structure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve upon the shortcomings as described in the Background, the subject disclosure is directed to a system for embedded concrete with an aesthetic element 10, which may be referred to simply as 'system 10' hereinafter. The system 10 may be used to partially embed decorative elements formed and/or 3D printed from plastic and similar materials within the surface of concrete. These decorative elements can provide a contrasting color, texture, and/or lighting relative to the concrete. In one example, numerous decorative elements can be used to effectively create murals or large-scale designs within the concrete. Additionally, in many situations, the decorative elements can be removed, replaced, adjusted, or otherwise moved, such that the surface of the concrete can be dynamically changed as needed.

Figure 1:
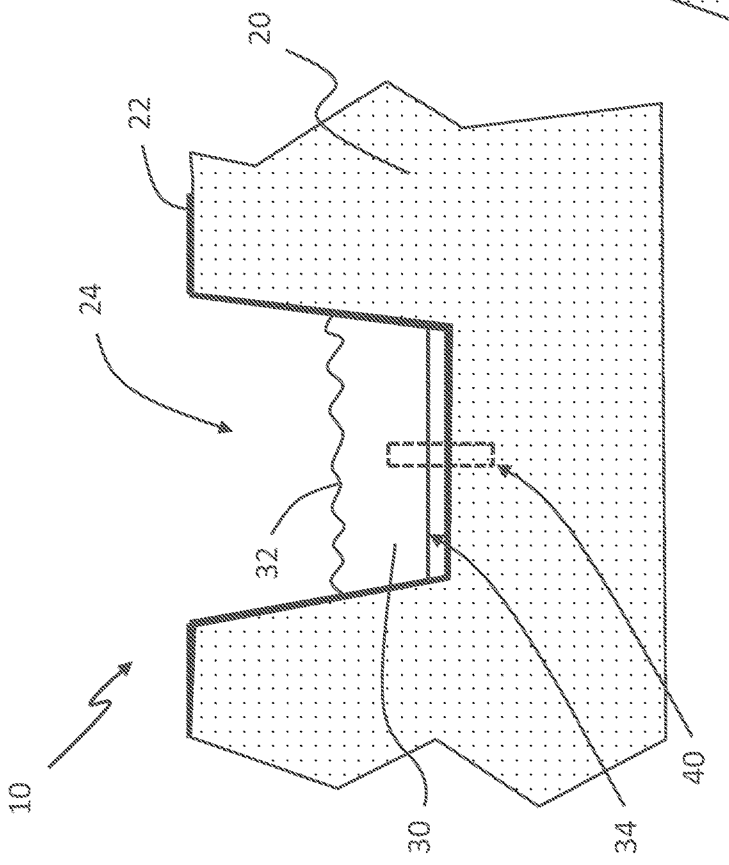
FIGS. 1-2 are cross-sectional diagrammatical illustrations of a system for concrete embedded with an aesthetic element, in accordance with a first exemplary embodiment of the present disclosure.
Figure 2:
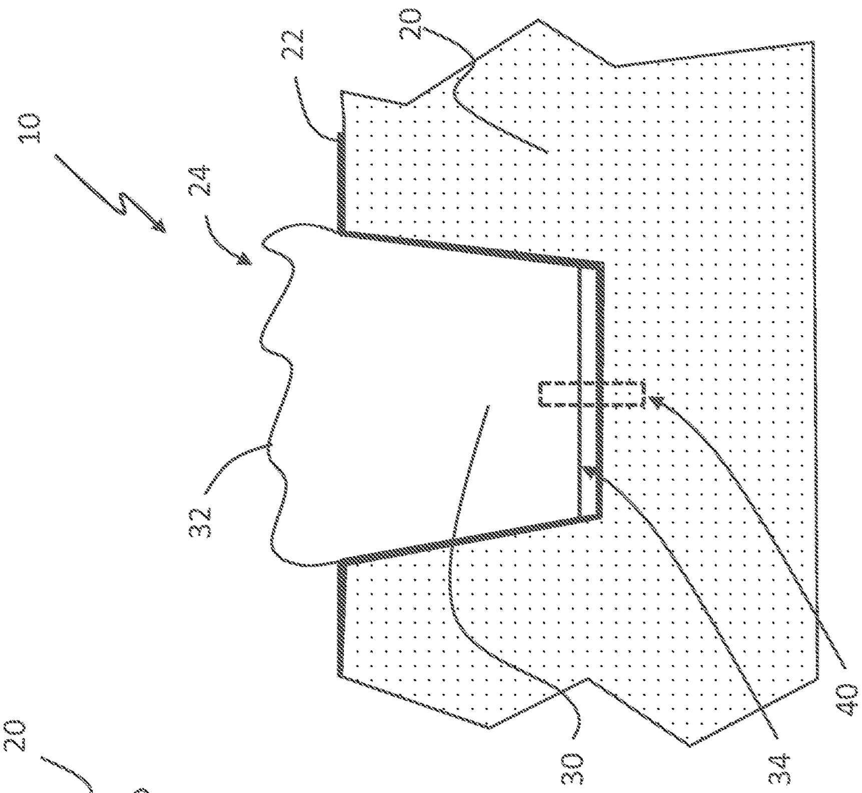

FIGS. 1-2 are cross-sectional diagrammatical illustrations of the system 10, in accordance with a first exemplary embodiment of the present disclosure. With reference to FIGS. 1-2, the system 10 includes a concrete structure 20 having at least one surface 22 with at least one molded shape 24 formed therein. The concrete structure 20 may be a precast concrete structure or on-site cast-in-place concrete structures, which is cured within a form or similar mold environment, and which may include any type of reinforcing structure, such as a metal grid, metal reinforcing rod, or the like. In one example, the concrete structure is a precast or on-site cast-in-place concrete structures structure having a predetermined width and height, such as 5 foot by 3 foot, or another size, which can be formed within a factory or warehouse setting and transported to an installation location. In another example, the concrete structure 20 may be cast or formed on-site.

The surface 22 of the concrete structure 20 which has the molded shape 24 may generally be an outermost surface which is exposed to the visually viewable portion of the concrete structure 20, such that the molded shape or shapes 24 formed therein are also viewable. The molded shape 24 may include any shape having any dimensions and any depth into the concrete structure 20. FIGS. 1-2, as general examples, illustrate the molded shape 24 as a square shape formed into the concrete structure 20, but the molded shape 24 may often include curvatures and depictions of items or imagery.

The aesthetic element 30 may be formed from a plastic material, such as an ASA plastic, ABS plastic, or PETG plastic, optionally with an alternative additive plastic, which are durable when exposed to environmental conditions, such as inclement weather, UV light, etc. The aesthetic element 30 may be sized to fit within one or more of the molded shapes 24. Often, the aesthetic element 30 will be formed to fit with a specific tolerance into the molded shape 24, such that there is a seamless barrier between the aesthetic element 30 and the sidewall of the molded shape 24, e.g., such that there is only a small gap of less than one inch or smaller between the molded shape 24 and the aesthetic element 30. As shown in FIGS. 1-2, the aesthetic element 30 may have an exposed surface 32 which has a texture or color which is selected by the user. For instance, the aesthetic element 30 in FIGS. 1-2 has a textured surface 32 which is exposed along the surface 22 of the concrete structure 20.

It is further noted that the aesthetic element 30 may have a surface 32 which is positioned substantially even or flush with the surface 22 of the concrete structure 20 or is positioned inset or outset from the surface 22. For example, in FIG. 1, the surface 32 of the aesthetic element 30 is inset within the molded shape 24, such that the surface 32 is positioned negatively offset from the surface 22 of the concrete structure 20. In contrast, in FIG. 2, the surface 32 of the aesthetic element 30 is positioned positively offset from the surface 22 of the concrete structure 20, such that it extends out beyond the surface 22. It is also possible for the surface 32 of the aesthetic element 30 to be flush with surface 22. Any combination of the position of the surface 32 relative to the surface 22 of the concrete structure 20, and any color or texture of the aesthetic element 30 is envisioned, all of which are considered within the scope of the present disclosure. Additionally, the aesthetic element 30 may have any other visual or textual appearance which differs from the surface 22 of the concrete structure 20. For instance, the surface 32 of the aesthetic element 30 may have written text, design, images, or other visual elements formed thereon.

The aesthetic element 30 may be retained within the molded shape 24 of the concrete structure with at least one fastening device 40 which is connected between the aesthetic element 30 and the concrete structure 20. The fastening device 40 may include a variety of fastening structures, such as threaded fasteners, adhesives, or structures which are embedded within the concrete structure 20 during cure. The fastening device 40 is depicted generically in FIGS. 1-2 but is described in more detail relative to FIGS. 9A-9D. It is noted that the backside 34 of the aesthetic element 30 may be in abutment with the floor of the molded shape 24 in the concrete structure 20, or it may be spaced a distance from the concrete structure 20. Additionally, it is noted that the aesthetic element 30 may have a tapered shape which mates with the sidewall angles of the molded shape 24, such that when the aesthetic element 30 is fastened to the concrete structure 20 it is drawn in tight until it achieves a stationary position.

Figure 3:
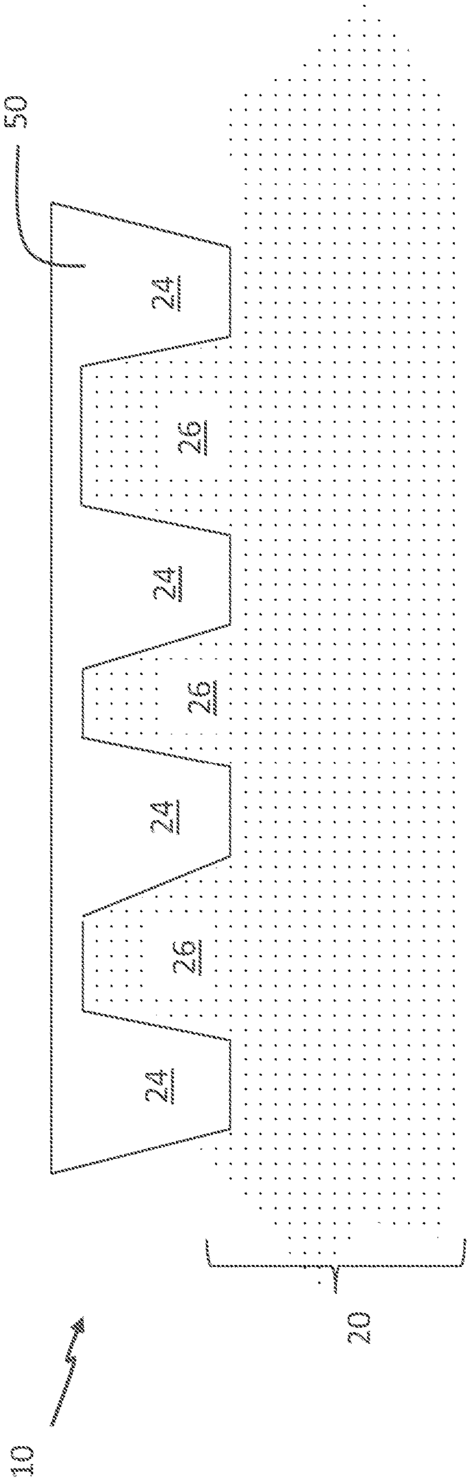
FIGS. 3-4 are cross-sectional and front view diagrammatical illustrations, respectively, of the system for concrete embedded with an aesthetic element, in accordance with the first exemplary embodiment of the present disclosure.
Figure 4:
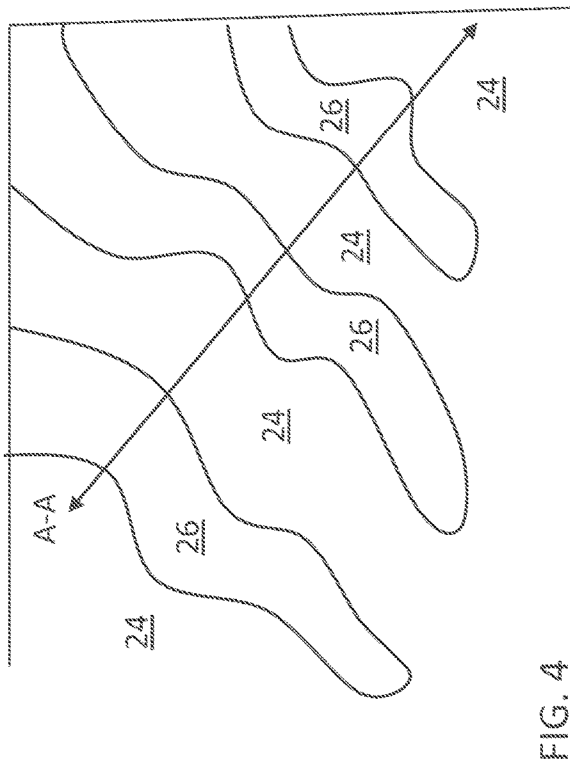

The system 10 may be manufactured within a factory equipped for making precast or on-site cast-in-place concrete structures. A form having a particular size may be generated and a quantity of uncured concrete may be placed therein. Prior to the concrete curing, a mold 50 may be used to create the molded shapes 24 within the uncured concrete which will form the concrete structure 20, as depicted in FIG. 3, which is a cross-sectional image of FIG. 4 taken on the line A-A. The mold 50 may have the shape and contour of the desired surface of the concrete structure 20, such as having a plurality of protrusions which are forced into the concrete 20. The end result may be a series of molded shapes 24 and a series of raised concrete areas 26. The molded shapes 24 can then be filled with the aesthetic elements to generate the desired imagery, color, texture, and/or lighting on the surface of the concrete structure 20.

Figure 5:
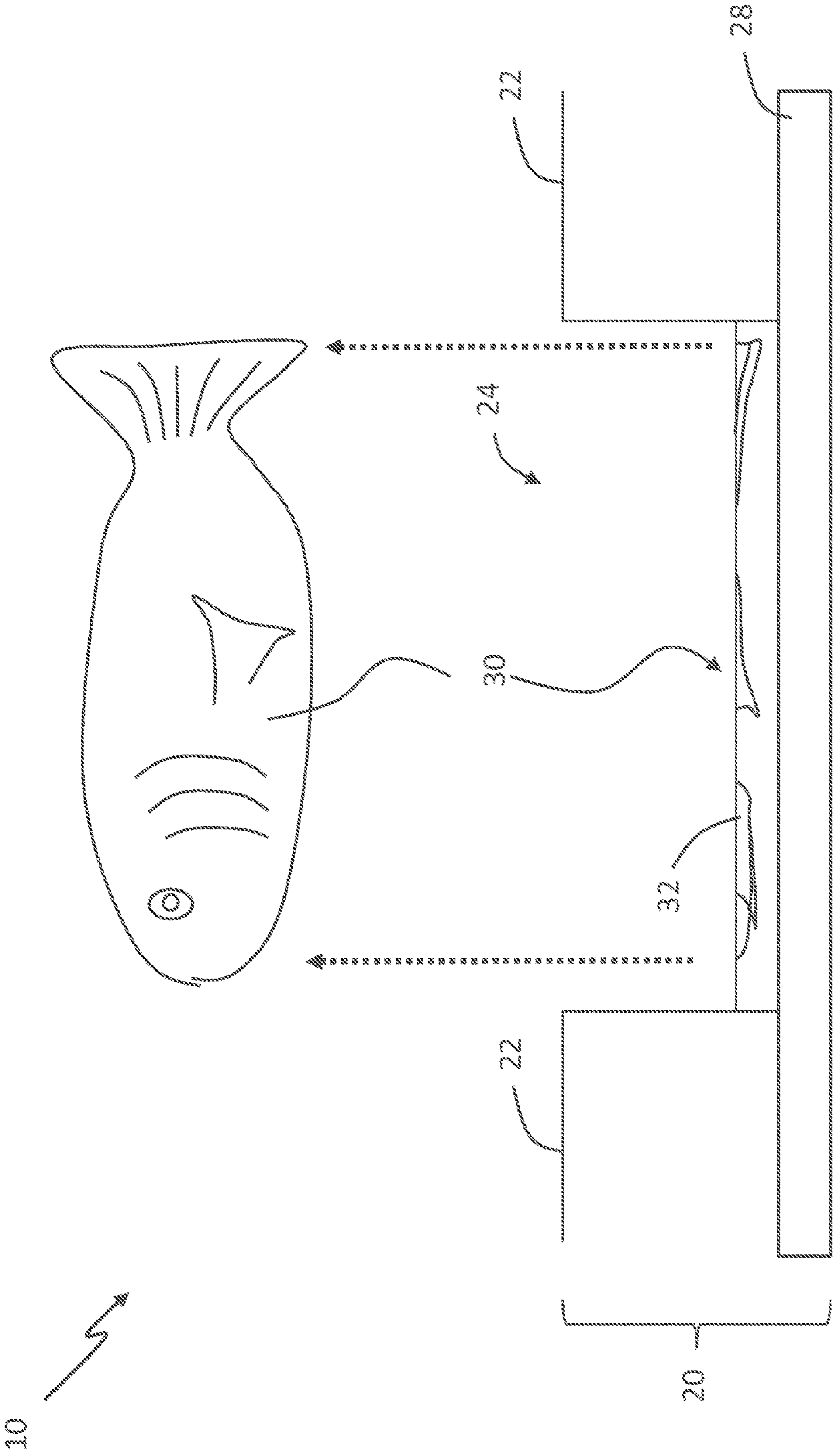
FIG. 5 is a diagrammatical illustration of the system for concrete embedded with an aesthetic element, in accordance with the first exemplary embodiment of the present disclosure.

In further detail, FIG. 5 is a diagrammatical illustration of the system for concrete embedded with an aesthetic element 30, in accordance with the first exemplary embodiment of the present disclosure. As shown, an aesthetic element 30, depicted as a fish, is partially embedded within a concrete structure 20. The concrete structure 20 includes a base concrete material 28 which serves as the backing material for the overall structure. Upon the base concrete material 28 is additional concrete which together form the concrete structure 20. The aesthetic element 30 is depicted as being inset into the concrete structure 20, with the broken-lined arrows depicting the overhead view of the aesthetic element 30. As can be seen, various features of the fish, such as the tail, the fins, or the gills, can be reproduced in the aesthetic element 30 to recreate the general look of the fish out of plastic. To this end, it may often be preferable to generate the plastic aesthetic elements 30 from a 3D printer or similar device, which can receive a computer-generated image and output a physical plastic reproduction of that image using a fused deposition modeling (FDM) technique. Additionally, the fish or different parts of the fish can have a specific color, such as those that reproduce the natural color of the fish, or that otherwise depict the fish in the desired color pattern.

It is noted that the specific dimensions of the aesthetic element 30 and concrete structure 20 may vary depending on the design and intended use. In one example, the concrete structure may have various thicknesses, whereas the aesthetic element 30 may have various thicknesses. For certain applications, the aesthetic element 30 or the concrete structure 20 may have smaller thicknesses.

Figure 6:
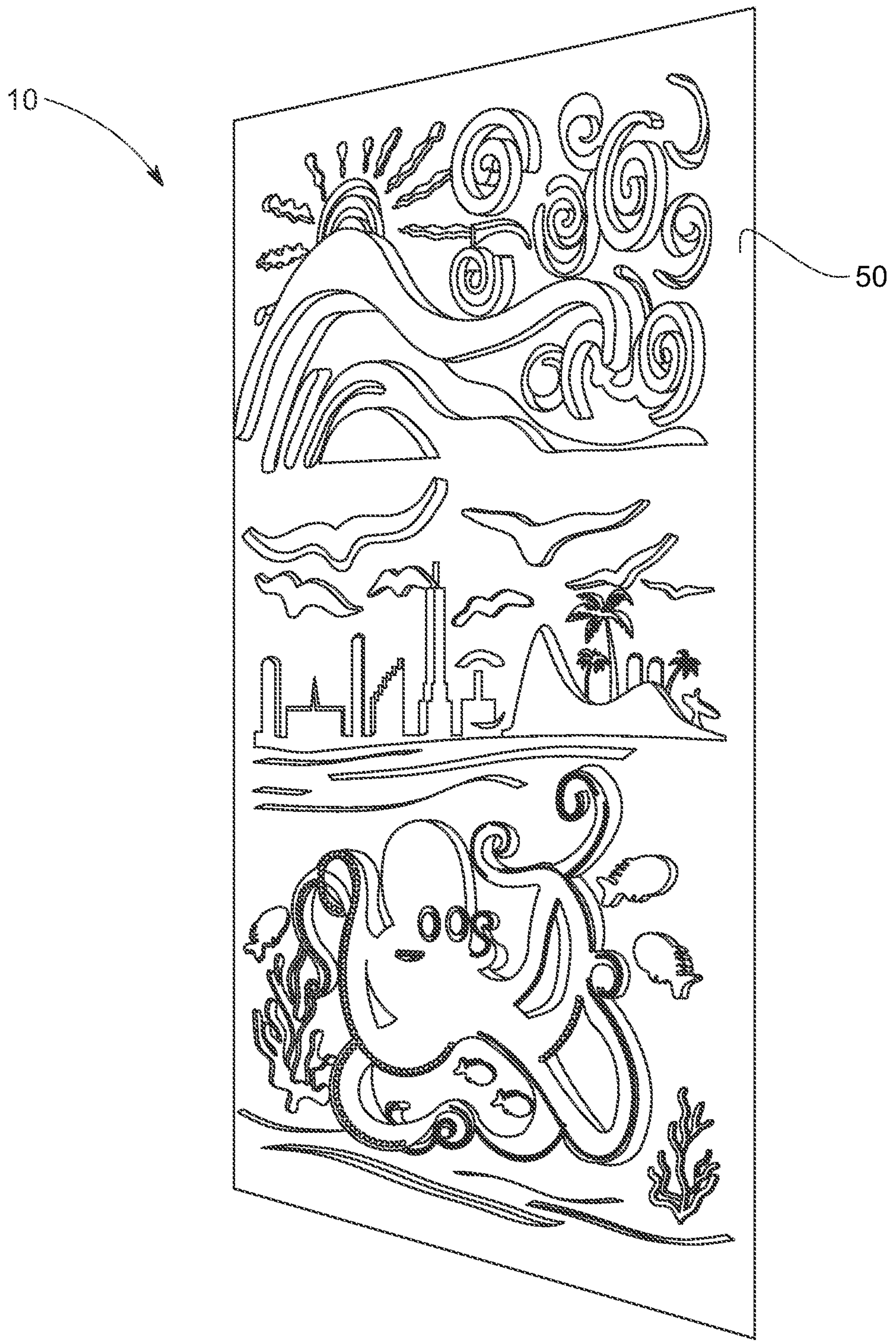
FIGS. 6-8 are illustrations of molds used with the system for concrete embedded with an aesthetic element, in accordance with the first exemplary embodiment of the present disclosure.
Figure 7:
Figure 8:
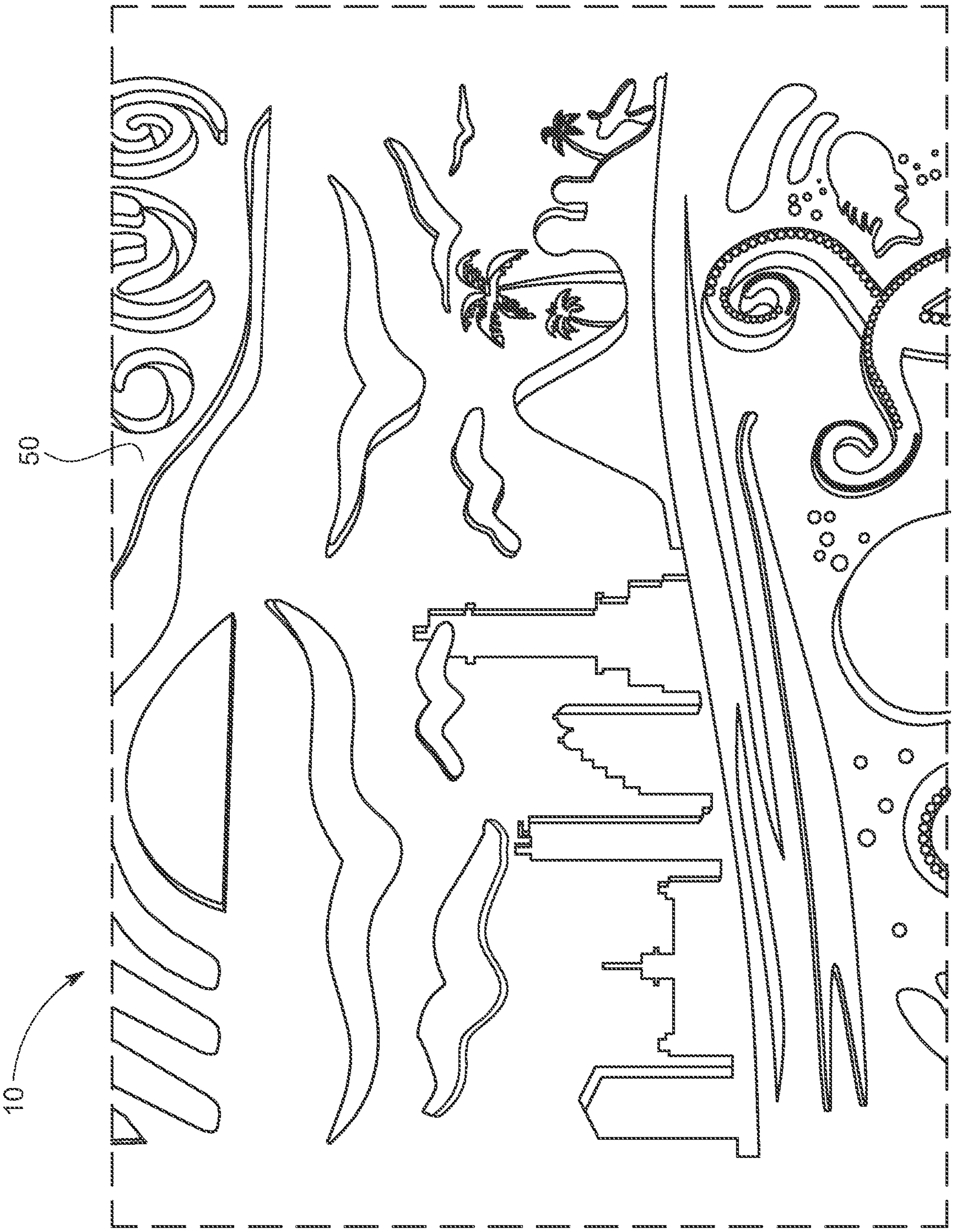

While FIG. 5 depicts a relatively simplistic example of a fish as the aesthetic element 30, it is noted that a plurality of aesthetic elements 30 can be used together to create large scale decorative patterns and murals. For example, FIGS. 6-8 are illustrations of molds 50 used with the system for concrete embedded with an aesthetic element, in accordance with the first exemplary embodiment of the present disclosure. As shown in FIGS. 6-8, numerous aesthetic elements can be used together to create murals which have both inset and outset features, such that a large portion of the structure is covered with decorative elements. When the molds 50 are used with the concrete, the molds 50 will generate raised and lowered surfaces in the concrete which match the design of the mold 50. Once the concrete is cured, the molds 50 may be removed and the plastic aesthetic elements can be inserted within the inset or lowered surfaces, or otherwise attached to the concrete. Thus, as can be understood, aesthetic elements 30 can be placed within the inset molded portions of the concrete and attached to the outer surface of the concrete, such that the aesthetic elements 30 can extend outwards varying degrees. This may allow, for example, one concrete structure to have aesthetic elements 30 which are positioned further outwards from one another, thereby providing a three-dimensional aesthetic view on the concrete. It is also noted that the molds 50 can be generated from 3D printing techniques, and the resulting molds can be used to form precast concrete structures or cast-in-place structures, even if those structures will not receive embedded plastic or other aesthetic elements.

Figure 9A:
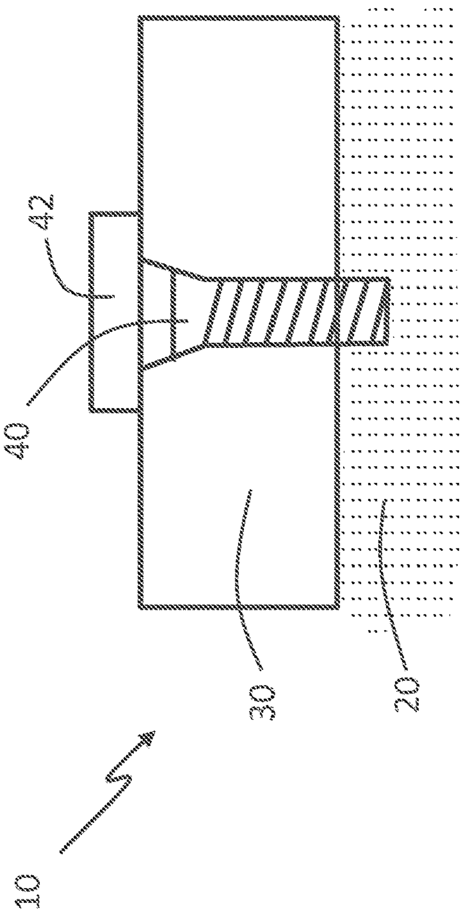
FIGS. 9A-9D are cross-sectional illustrations of fasteners used with the system for concrete embedded with an aesthetic element, in accordance with the first exemplary embodiment of the present disclosure.

FIGS. 9A-9D are cross-sectional illustrations of fasteners used with the system for concrete embedded with an aesthetic element 30, in accordance with the first exemplary embodiment of the present disclosure. As shown, there are various fastening devices 40 which may be used to retain the aesthetic elements 30 to the concrete structure 20. For example, as shown in FIG. 9A, a threaded fastener 40 may be inserted within a hole formed in the aesthetic element 30, such that the fastener 40 extends beyond the rear face of the aesthetic element 30 and into the concrete structure 20. In this situation, the head of the fastener 40 may be positioned inset the outer face of the aesthetic element, and a cap 42 or similar structure may be used to cover the fastener 40 head. Since the cap 42 may be removed to allow access to the fastener 40, it is possible for the aesthetic element 30 to be removed from the concrete structure 20, such that it can be replaced or otherwise adjusted. In turn, this type of fastener 40 may allow for all aesthetic elements 30 on a concrete structure 20 to be removed, if need be.

Figure 9B:
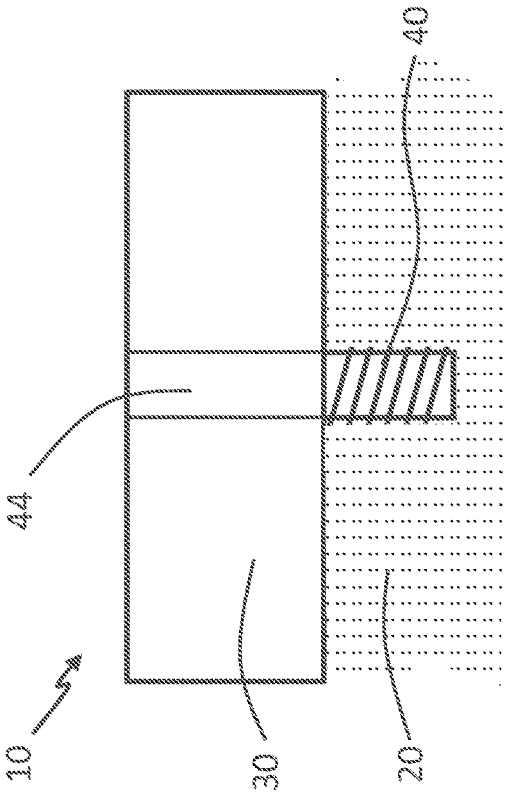
Figure 9C:
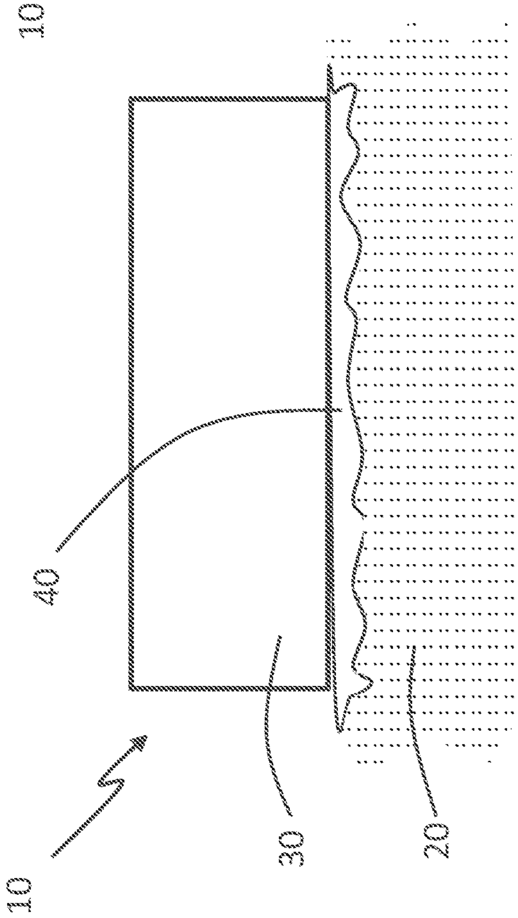
Figure 9D:
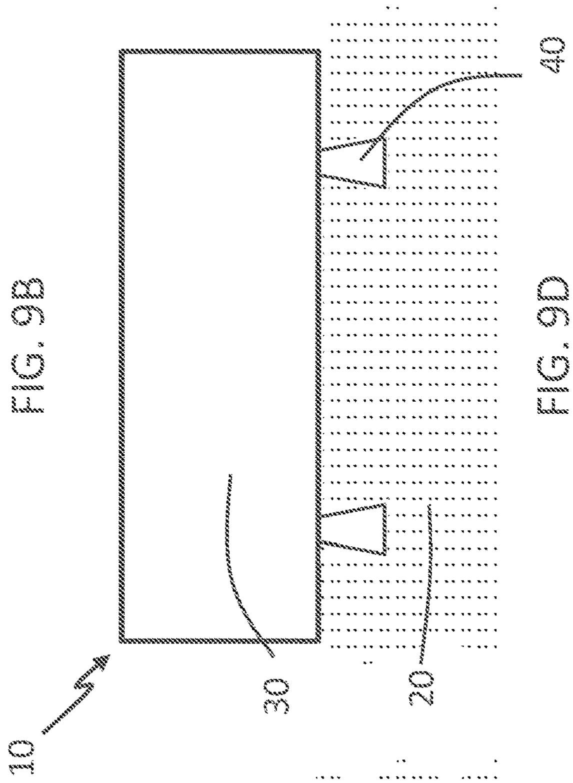

In FIG. 9B, a similar threaded fastener 40 is provided which is mounted to a dowel 44 which extends from the aesthetic element 30. This type of fastener may be permanent, in that, the threaded fastener 40 which is connected to the dowel 44 may be positioned within the concrete structure 20 and locks in place. In FIG. 9C, the fastener 40 is depicted as an adhesive which is positioned between the rear face of the aesthetic element 30 and the concrete structure 20, and which is strong enough to retain the aesthetic element 30 to the concrete structure 20 once cured. An example of the adhesive may be construction adhesive, silicon adhesive, or a similar material. In FIG. 9D, the fastener 40 is depicted as an anchor which is cast into the concrete prior to it curing, such that it cures around the fastener 40 and locks the aesthetic element 30 to the concrete structure 20. Any variation or combination of fasteners 40 may be used, including those not described herein.

Figure 10A:
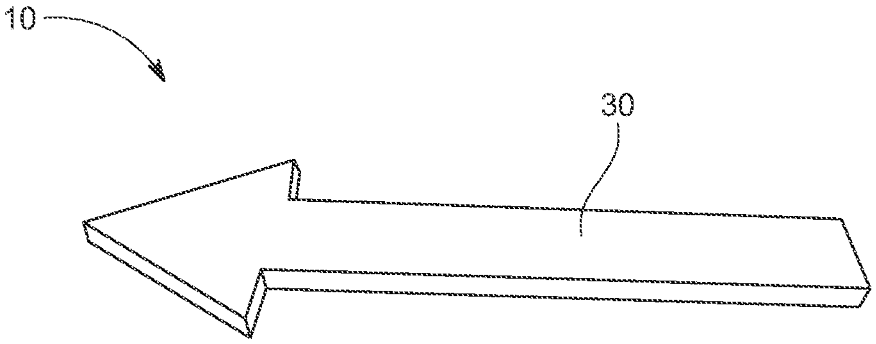
FIGS. 10A-10D are illustrations of aesthetic elements used with the system for concrete embedded with an aesthetic element, in accordance with the first exemplary embodiment of the present disclosure.
Figure 10B:
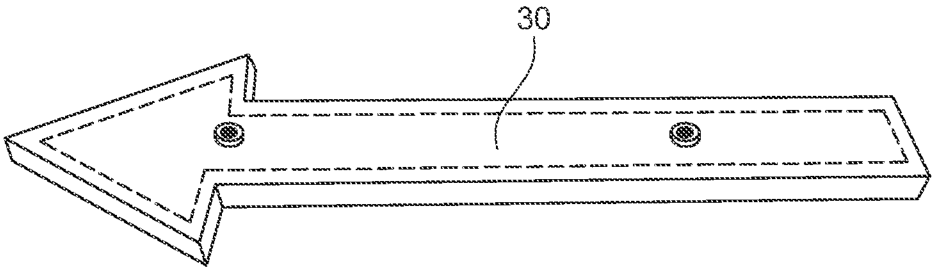
Figure 10C:
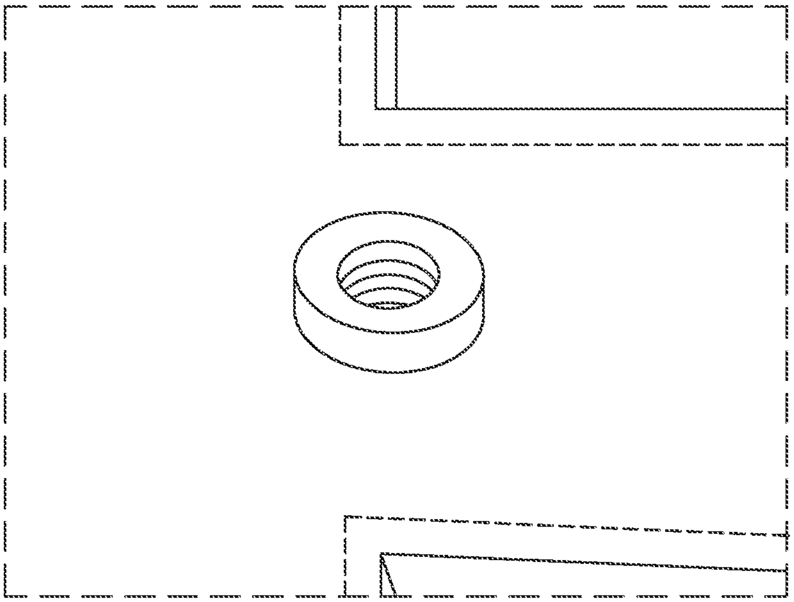
Figure 10D:
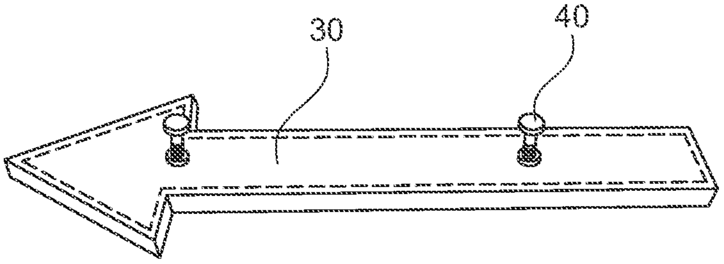

FIGS. 10A-10D are illustrations of aesthetic elements used with the system for concrete embedded with an aesthetic element 30, in accordance with the first exemplary embodiment of the present disclosure. In particular, FIGS. 10A-10D depict an aesthetic element 30 which is formed from ASA plastic, ABS plastic, and/or PETG plastic, optionally with an alternative additive, by a 3D printing device to have the shape of a directional arrow, which can be used as a vehicular or pedestrian traffic sign. As shown, FIG. 10A depicts the front face of the aesthetic element which is visible when mounted. FIG. 10B depicts the rear face of the aesthetic element, where protrusions or threaded holes provided for attachment. FIG. 10C is a detailed image of the protrusion with threaded hole, to which a threaded fastener 40, as shown in FIG. 10D, can be inserted. The resulting structure can then be mounted to the concrete structure (not shown), either in a removable fashion or permanently.

Figure 11:
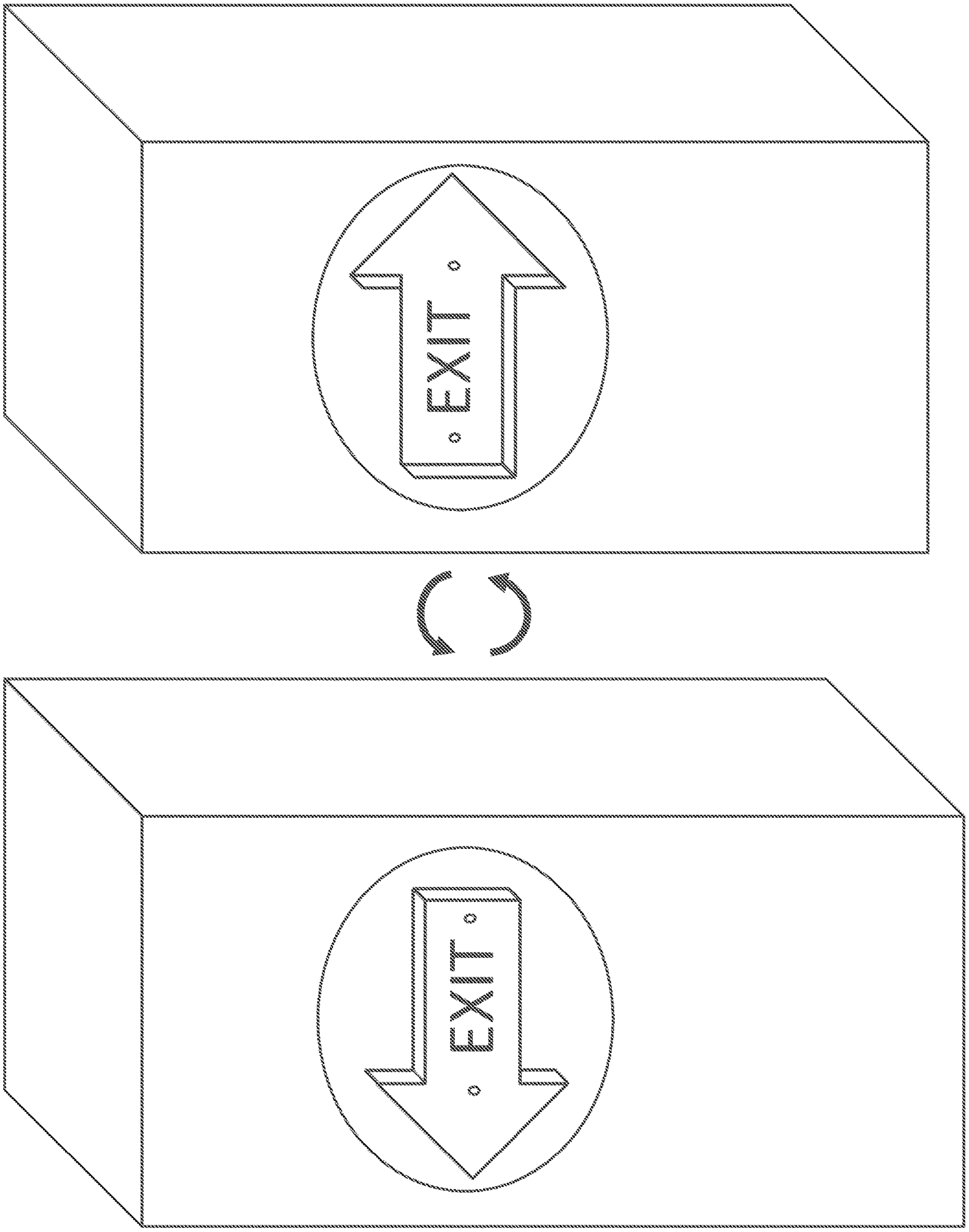
FIG. 11 is a diagrammatical illustration of the system for concrete embedded with an aesthetic element, in accordance with the first exemplary embodiment of the present disclosure.

The direction arrow of FIGS. 10A-10D may be used in a variety of settings, such as, for instance, within a parking garage to provide directional instructions for drivers to enter or exit. Conventionally, directional signs on concrete structures, such as pillars and posts within concrete parking garages, are either painted on the concrete or are fashioned from traditional metal street signs which are bolted to the concrete. When these signs need to be replaced or changed, they either need to be painted over or fully removed. In contrast, as shown in FIG. 11, with the subject invention, when a directional sign is implemented as the aesthetic element 30 of the system 10, it can be easy to remove the sign and reposition it, if necessary. For example, if the direction of traffic in a parking garage changes or a different exit is opened, the aesthetic element 30 can simply be removed and repositioned as needed.

Figure 12:
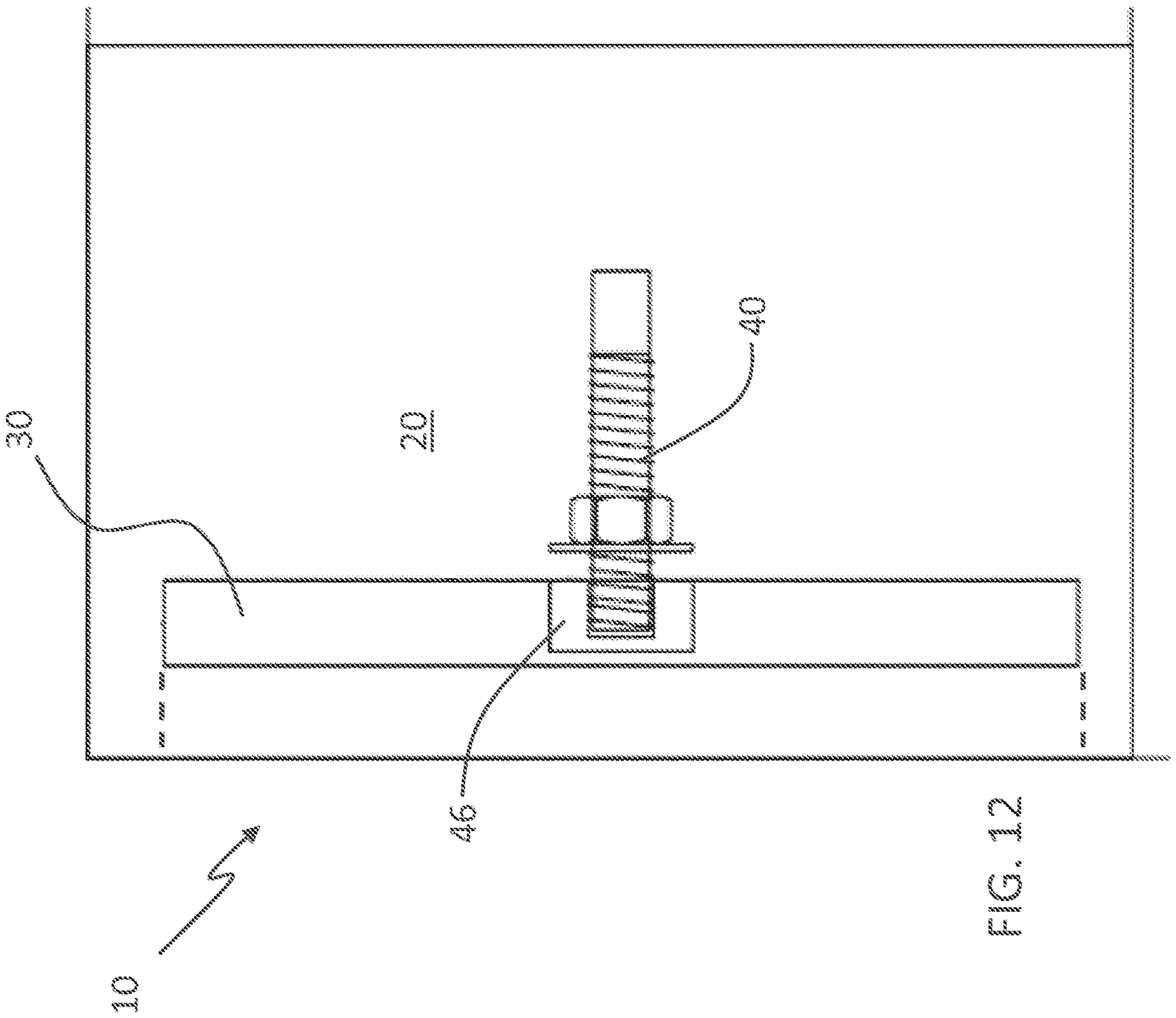
FIGS. 12-14 are diagrammatical illustrations of the system for concrete embedded with an aesthetic element, in accordance with the first exemplary embodiment of the present disclosure.
Figure 14:
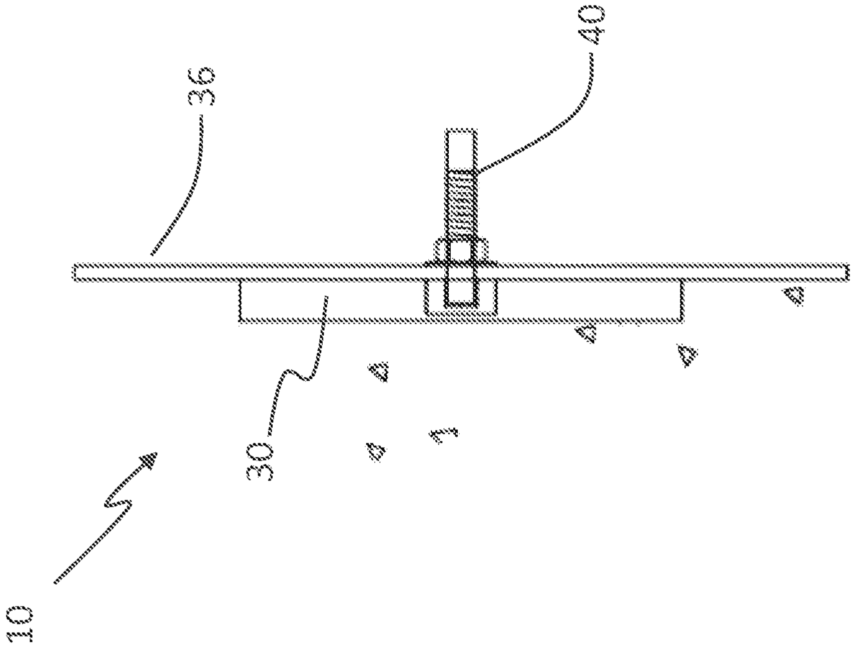
Figure 13:
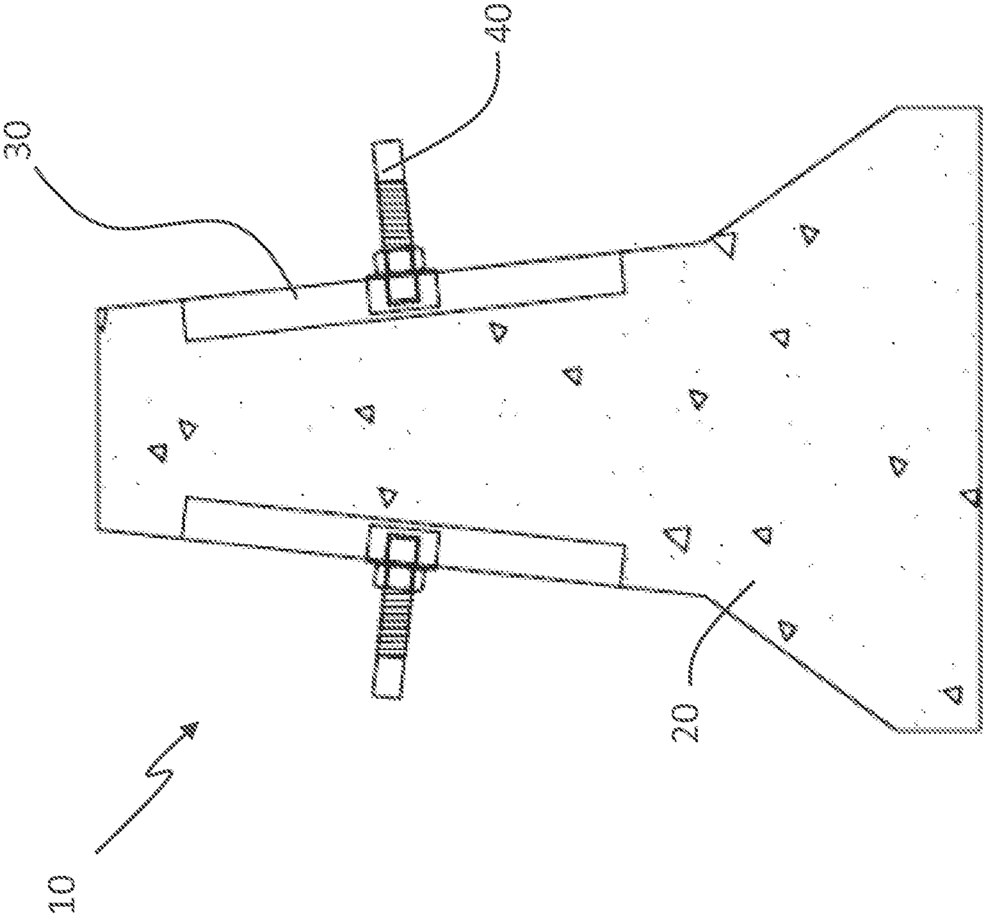

Another example of the subject invention is depicted in FIGS. 12-14, which are diagrammatical illustrations of the system for concrete embedded with an aesthetic element, in accordance with the first exemplary embodiment of the present disclosure. In particular, FIGS. 12-14 illustrate the system implemented on concrete road barriers, such that the concrete forming the road barrier serves as the concrete structure to which the aesthetic element can be mounted. Various mounting techniques can be used, as described herein, or as depicted in FIGS. 12-14.

For instance, in FIG. 12, the aesthetic element 30 may be connected to the concrete structure 20 with a fastening device 40 which is implemented as a threaded rod. A female end receiver 46 may be secured to the aesthetic element 30, such that a first end of the threaded rod is connectable to the aesthetic structure 30. A hex nut and washer, or similar structure, may be placed on the threaded rod, and the opposing end of the threaded rod may have a flat end which is embedded into the concrete structure 20. This example of fastening the aesthetic structure 30 to the concrete structure 20 allows the aesthetic structure 30 to sit within the mold or inset 24 of the concrete structure 20, which may provide functional benefits with preventing damage to the aesthetic structure 30. For instance, in the use with construction barriers, placing the aesthetic structure 30 inset within the concrete may help ensure the aesthetic structure 30 isn't inadvertently hit by a vehicle.

In FIGS. 13-14, the example shows the use of the aesthetic structure 30 as a mold within the concrete structure 20, which is a construction barrier. The aesthetic structure 30 can have a form material 36 constructed from wood, metal, or another material, along with a threaded rod fastener 40 which allows it to be removed from the concrete structure 20. After the aesthetic structure 30 is used in the molding process, the aesthetic structure 30 can be removed, thereby leaving a molded cavity within the construction barrier.

Figure 15:
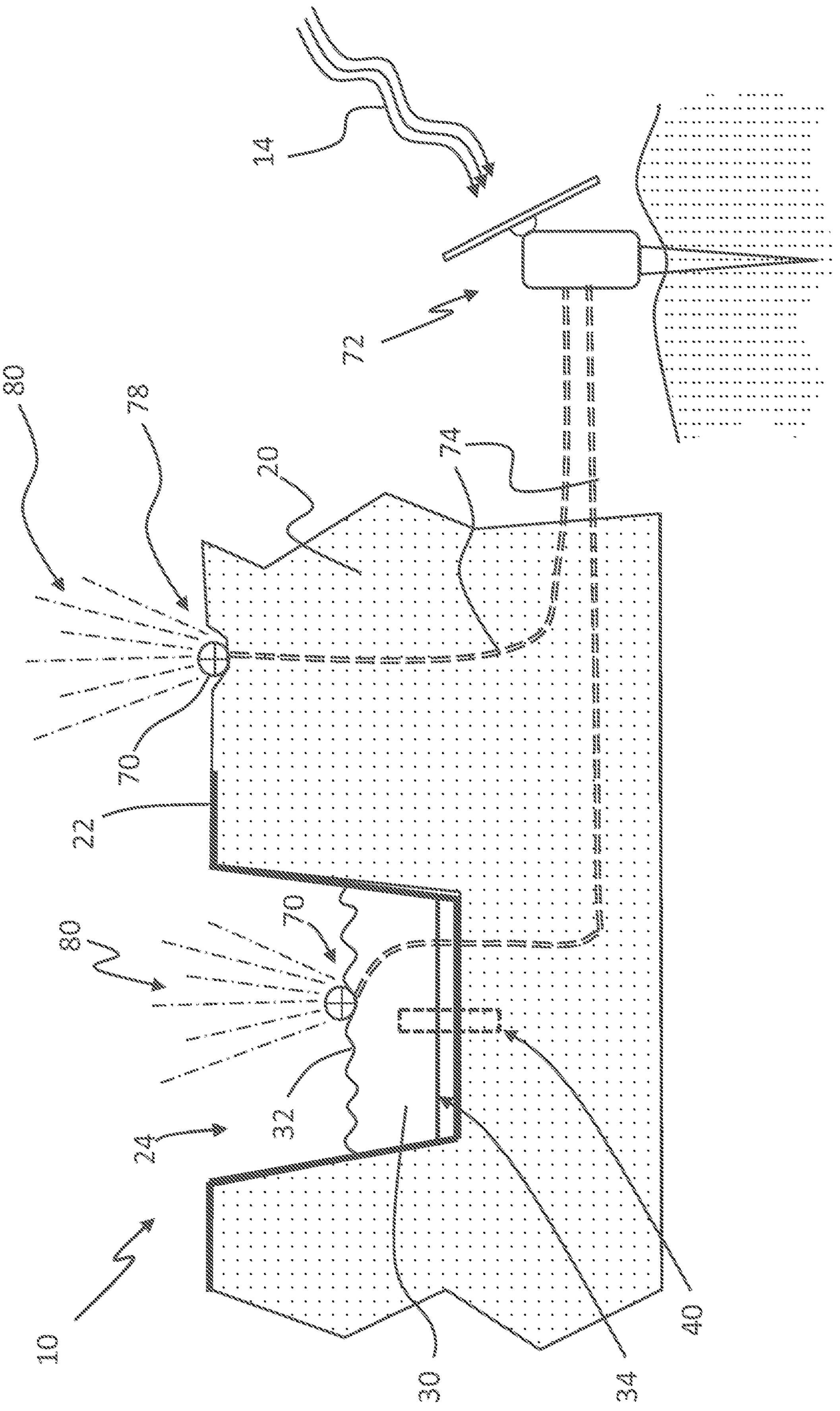
FIGS. 15-16 are diagrammatical illustrations of the system for concrete embedded with an aesthetic element in use with a lighting device, in accordance with the first exemplary embodiment of the present disclosure.
Figure 16:
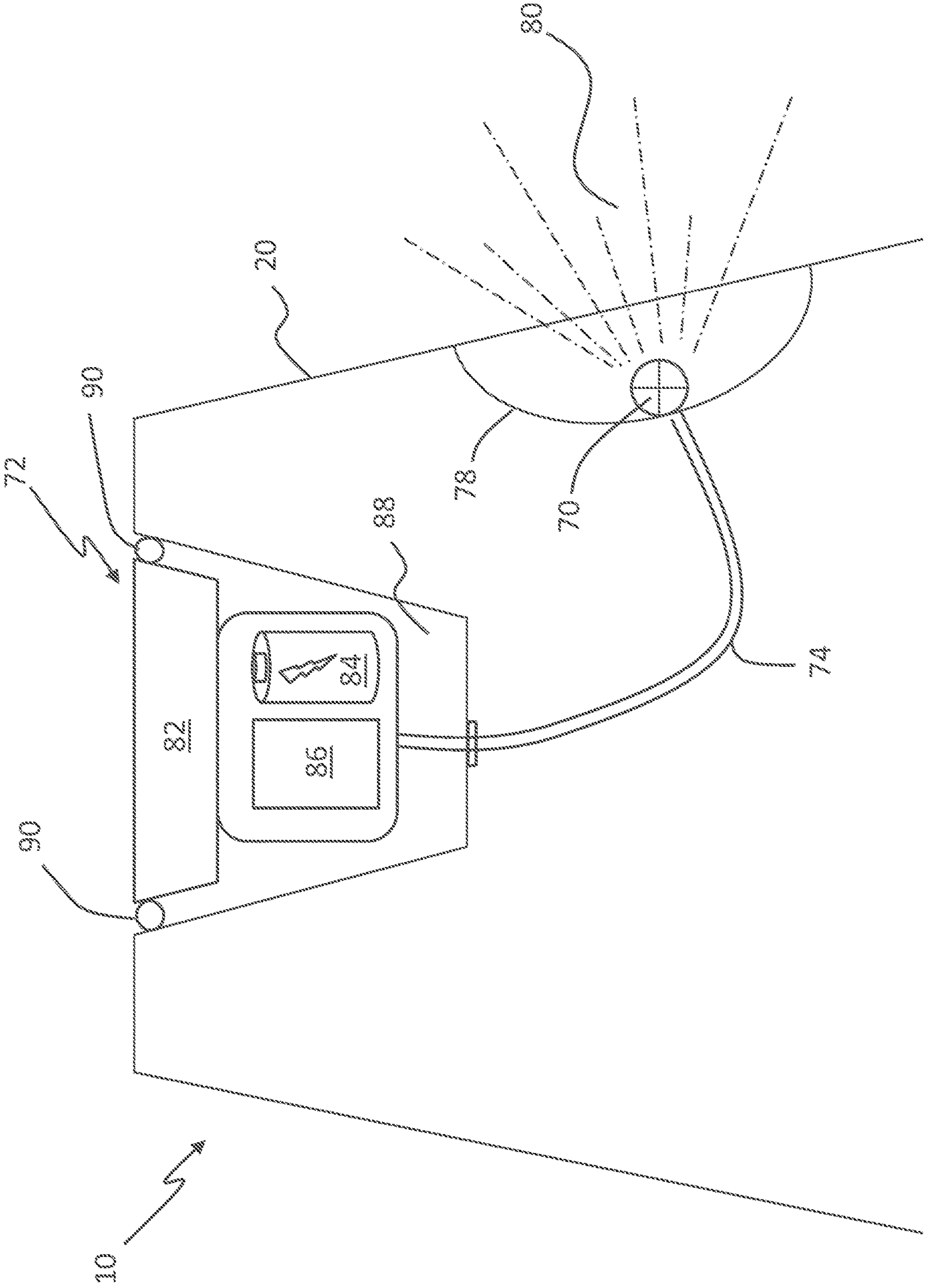

In another example of the subject invention, FIGS. 15-16 depict the system 10 in use with a lighting device 70 which is integrated into at least a portion of the concrete structure 20 or the aesthetic element 30, in accordance with the first exemplary embodiment of the present disclosure. In addition to the components of the system 10 previously discussed, but not specifically noted relative to FIGS. 15-16, the system 10 further includes a lighting device 70 which may include a light bulb or diode, such as an LED, and which is positioned within a housing, or on a chip in the case of an LED. The lighting device 70 receives electrical power from a power supply 72, such as a photovoltaic (PV) panel, to provide illuminated features to the system 10, such as by shining light outwards from the concrete structure 20 and aesthetic element 30, or by accenting parts of the aesthetic element 30 with lighting, among other uses. It is noted that any type of lighting device 70 may be used, but LED-based lighting devices may be preferred due to their relatively low energy consumption and bright illumination. The lighting device 70 may be connected with the power supply 72 through use of a wire 74 or electrical cable which is embedded or otherwise positioned within the concrete structure 20 and/or the aesthetic element 30. For instance, when the concrete structure 20 and/or the aesthetic element 30 are formed, it may be formed with cast tubes through which the wires 74 can be later placed, or it can be cast with the wires 74 in place such that they are non-removable from the concrete structure 20 and/or the aesthetic element 30. In other examples, it may be possible to use induction power to supply electrical power to the lighting device 70, therefore, such that a wire 74 is not needed.

The lighting device 70 may be positioned within the concrete structure 20 and/or the aesthetic element 30 in a location proximate to an exposed surface thereof, such that the light 80 provided by the lighting device 70 may be directed outwards from the concrete structure 20 and/or the aesthetic element 30. The lighting device 70 may be affixed to a surface of the concrete structure 20 and/or the aesthetic element 30, or the lighting device 70 may be positioned within a cavity 78 formed within the surface of the concrete structure 20 and/or the aesthetic element 30. The use of the cavity 78 can help direct the light 80 towards the intended position and allow the lighting device 70 to remain in a position safely away from where it might be damaged by an external implement. It is noted that the position of the lighting device 70 can be adjusted, such as further inset within a cavity 78, along various contours of the aesthetic element 30, or to other positions, as desired with the design, all of which are considered within the scope of the present disclosure.

Additionally, as depicted in FIG. 15, it is possible for a plurality of lighting devices 70 to be used in various locations on the concrete structure 20 and/or the aesthetic element 30. For example, in addition to lighting devices 70 directing light 80 from the concrete structure 20, it may be possible to use one or more lighting devices 70 within the aesthetic element 30. In FIG. 15, these lighting devices 70 are depicted as part of both the aesthetic feature 30 which is positioned on the concrete structure 20, and as part of the concrete structure 20 itself. As discussed relative to the previous figures, the aesthetic feature 30 may be a decorative structure which can be integrally affixed or formed on the concrete structure, or it may be a structure which can be applied separately to the concrete structure 20. This aesthetic feature 30 may be especially useful to add a design, a logo, text, or artwork to the concrete structure 20. The aesthetic feature 30 may also be a design which is cast directly into the concrete structure 20.

One or more power supplies 72 may be used to provide a quantity of electrical power to the lighting devices 30. The power supply 72 may include any type of power supply, such as hard-wired electrical power, electrical power supplied through a plug-in at a receptacle, solar power, or any combination thereof. In FIG. 15, the power supply 72 is depicted as a solar power unit which is integrated into the concrete structure 20 and the aesthetic element 30, such that the system 10 does not need to be plugged in to a traditional power outlet, and can be relocated with ease. The solar power unit may include a photovoltaic cell or cells positioned at an exterior surface of the concrete structure 20 and/or the aesthetic element 30, or the PV cell or cells may be built into the concrete structure 20 and/or the aesthetic element 30 itself, such that they can receive sunlight 14 to generate an electrical current which can be provided to the lighting device 70 simultaneously, or at a later point in time.

FIG. 16 is a detailed cross-sectional diagrammatical illustration of a portion of the concrete structure 20 with an integrated lighting device 70 discussed relative to FIG. 15. In particular, FIG. 16 depicts a detailed image of the top edge portion of the concrete structure 20 showing the lighting device 70 and the power supply 72 mounted into the concrete structure 20. The power supply 72, depicted as a solar unit, includes a photovoltaic (PV) panel 82 which is positioned along an outer edge of the concrete structure 20, such that it can receive sunlight. The PV panel 82 may be connected to a battery 84 which can store the electrical energy produced by the PV panel 82 during the sunlight hours, whereby the electrical energy is discharged at night or when the lighting is desired. The solar unit may include control circuitry with a light sensor or photo eye 86 which can detect sunlight, thereby controlling the operation of the lighting device 70 without requiring the user to manually turn the lighting device 70 on or off. Additional or different components, as commonly used with solar-powered devices, can also be included.

It is further noted that the solar unit power supply 72 can be integrated into the concrete structure 20 itself, such as where a channel 88, either a single continuous channel or a plurality of separate channels, is formed in the outer surface of the concrete structure 20 which is likely to receive the greatest quantity of sunlight. In this example, the channel 88 may have a depth which can receive the power supply 72 components, as shown, with the PV panel 82 positioned along the outermost surface of the concrete structure 20. The power supply 72 components may be formed together as a unitary structure which is weather tight, such that water will not infiltrate the electronics, or it may also be possible to use a water-sealing device, such as a gasket 90 which ensures that water does not gain access to the channel 88. In other examples, the power supply 72 can be affixed to or on the concrete structure 20 without positioning it within the sidewall or surface of the concrete structure 20 itself, all such designs and possibilities are considered within the scope of the present disclosure.

FIGS. 17-23 are diagrammatical illustrations of front and back plates used with the system for concrete embedded with an aesthetic element 10, in accordance with the first exemplary embodiment of the present disclosure. In particular, FIGS. 17-23 depict the components which may be used to form the aesthetic element assembly 60, including a back plate 62, a front plate 64, and the aesthetic element 30 which is positionable within the front plate 64. Together, the components of the aesthetic element assembly 60 may be used to provide an illuminated design on a concrete structure 20, where the design can include various shapes, sizes, lighting colors, or other features.

Figure 17:
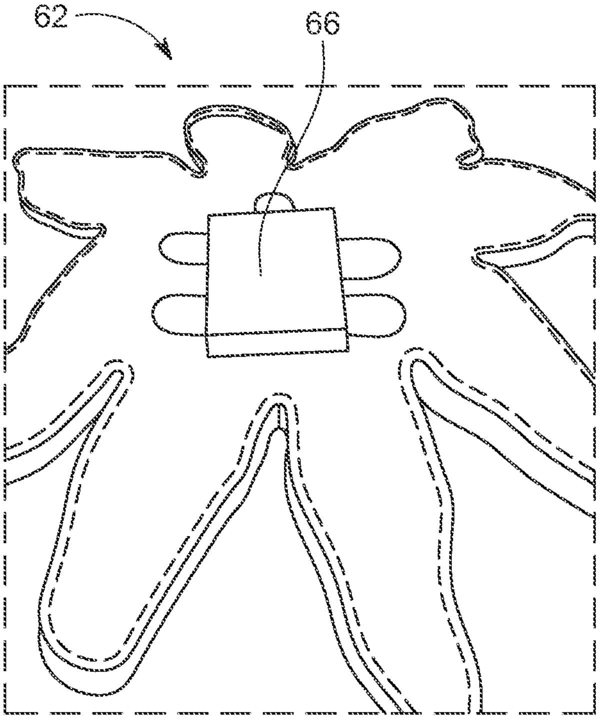
FIGS. 17-23 are diagrammatical illustrations of front and back plates used with the system for concrete embedded with an aesthetic element, in accordance with the first exemplary embodiment of the present disclosure.
Figure 18:
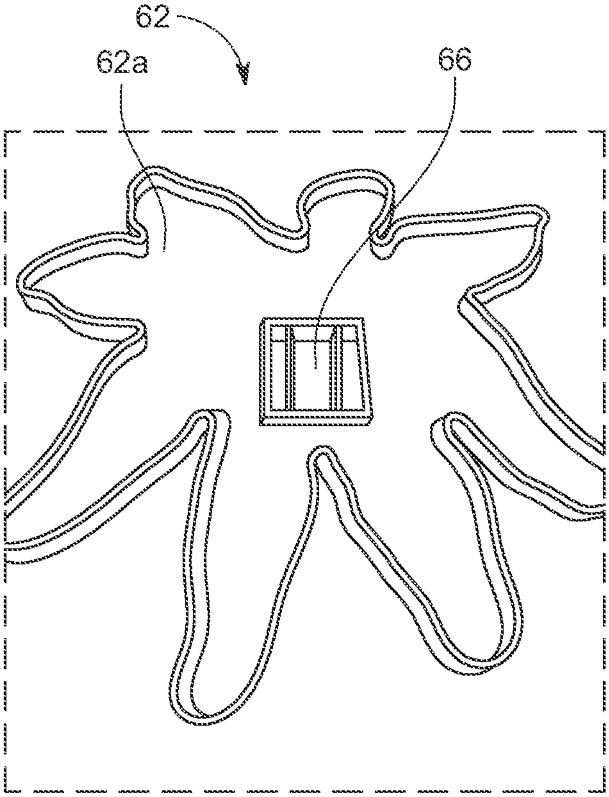

As shown in FIGS. 17-18, the back plate 62 may have various shapes and footprints, such as a chili pepper or flower shape, as depicted. The front surface of the back plate 62 is depicted in FIG. 18, where a box 66 is formed within the back plate 62 to receive electrical wiring for providing illumination to the aesthetic element 30. The box 66 may extend through the back plate 62, such that it can be seen on the rear side of the back plate 62, as shown in FIG. 17. The front side of the back plate 62 may include an inset portion 62A which is able to receive all or part of the front plate 64, whereby the inset portion 62A may be defined by a sidewall of the back plate 62 which is positioned at an exterior edge of the back plate 62. In use, the electrical wiring may be positioned within the concrete structure 20, such as within tubing or conduit placed within the concrete structure 20 during a forming process, and the wiring may extend from an external power source to the box 66.

Figure 19:
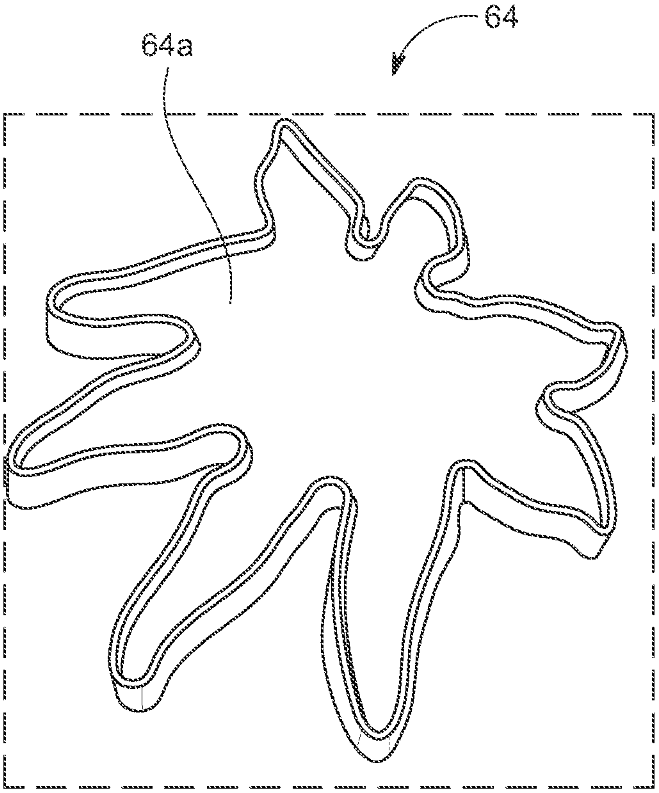
Figure 20:
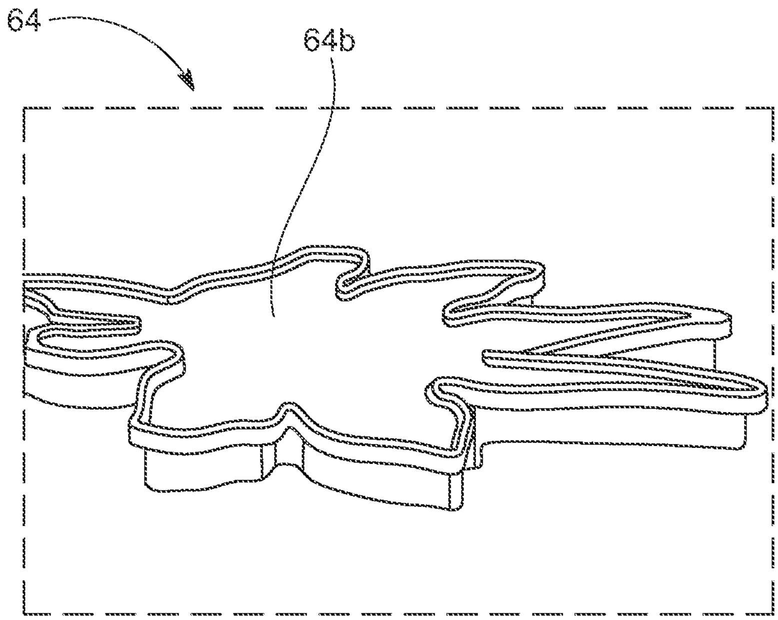
Figure 21:
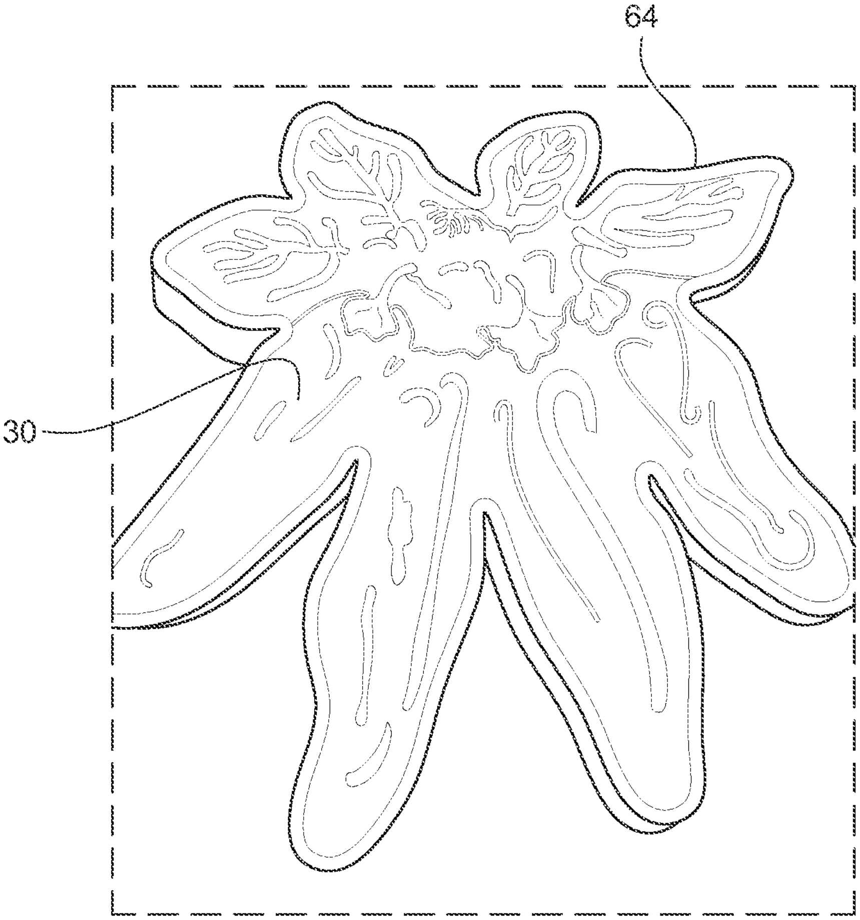

FIGS. 19-20 depict the front plate 64 by itself, and FIG. 21 depicts the front plate 64 with the aesthetic element 30 positioned therein. As shown, the front plate 64 may include a structure with a general shape or footprint which substantially matches or corresponds to that of the back plate 62. On an interior side of the front plate 64, as shown in FIG. 19, there may be an internal cavity 64A which is sized to receive the illumination devices, such as lights, LEDs, or other fixtures. This internal cavity 64A may be defined by the sidewall of the front plate 64 and have various depths, often an inch or two, which provides sufficient space for holding the illumination fixtures and associated electrical wiring. The front face of the front plate 64, which is shown in FIG. 20, includes a small, recessed cavity 64B which is defined by a short wall formed around the edges of the front plate 64. The recessed cavity 64B may be sized to receive the aesthetic element 30, as shown in FIG. 21, such that the aesthetic element 30 substantially resides in the recessed cavity 64B with the edges of the front plate 64 positioned around the aesthetic element 30.

Figure 22:
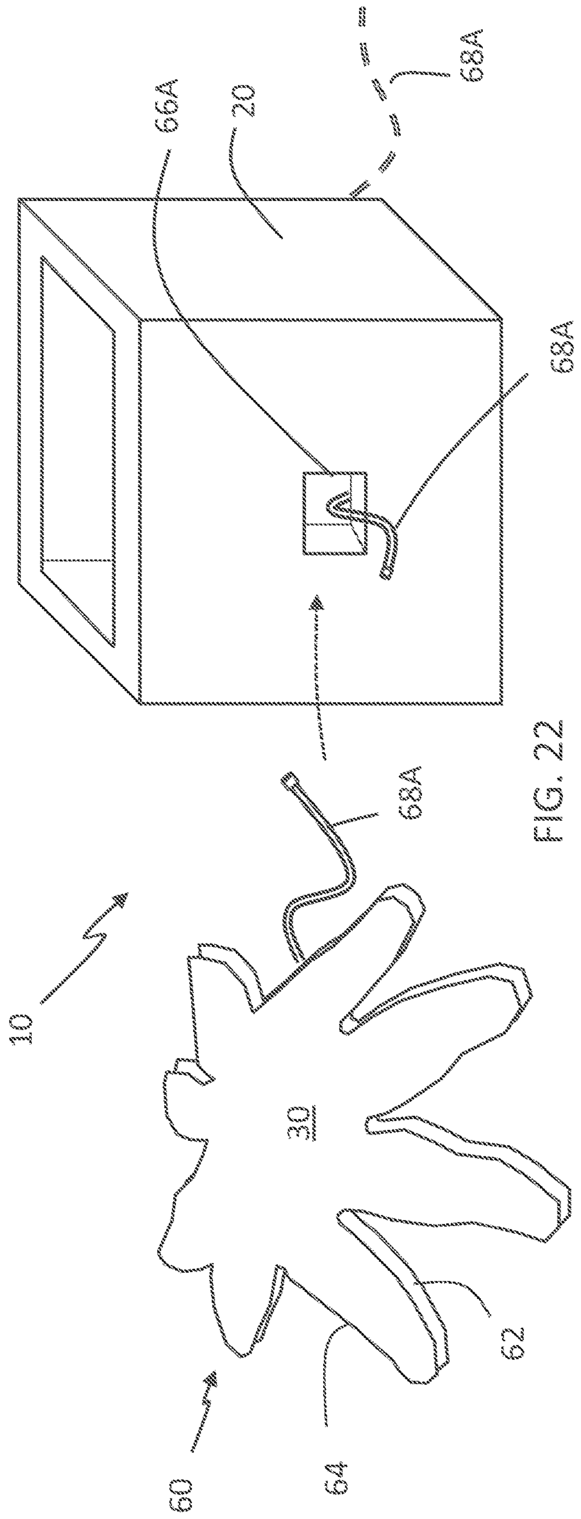
Figure 23:
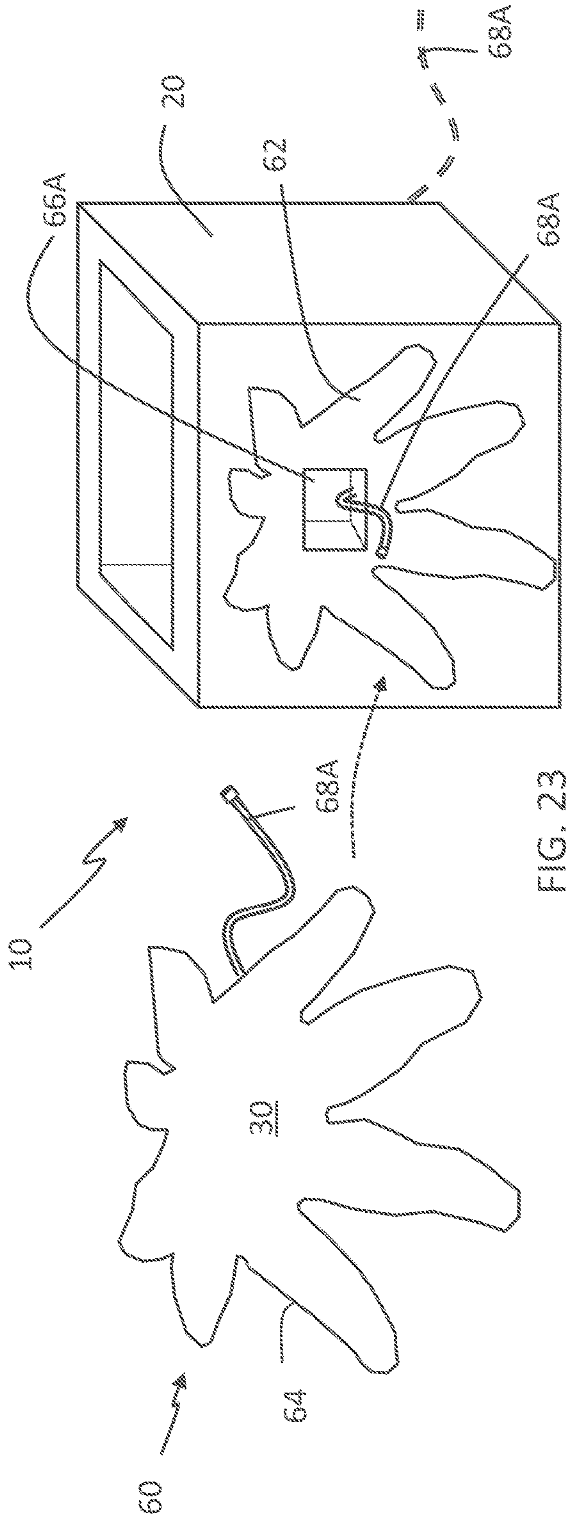

FIGS. 22-23 a diagrammatical depictions of the aesthetic element assembly 60 in two variations. In FIG. 22, an example is shown where the aesthetic element assembly 60 is fully mountable and removable to the concrete structure 20, in particular, where the front plate 64 having the aesthetic element 30 is connected to the back plate 62, and the combined structures are positionable or mountable to the concrete structure 20. As can be seen, these components of the aesthetic element assembly 60 can be mounted over a matching box 66A to the box 66 on the back plate 62, such that the power supply wiring 68A, which extends from a power source (solar, grid-based, off-the-shelf, custom, or otherwise) through the concrete structure 20 and to the box 66A, can be connected to the wiring 66B for the lights within the aesthetic element assembly 60. In this example, the aesthetic element assembly 60 can be fully removable and mountable to the concrete structure 20, such that both the front plate 64 and back plate 62 are able to be mounted or removed to the concrete structure 20, which allows a user to vary the aesthetic element 30 design used with a particular concrete structure 20 at any given time.

FIG. 23 illustrates a similar example, but one where the back plate 62 is molded or formed within the concrete structure 20 itself during a formation process. As shown, the back plate 62 may be positioned within a concrete mold when the concrete structure 20 is poured, such that it is encased in one or more side faces of the concrete structure 20. In this position, the inner face of the back plate 62 may be exposed on the outer edge of the concrete structure 20, such that the box 66A with the power supply wiring 68A are both accessible. The front plate 64 with the aesthetic element 30 are then mountable to the back plate 62, such as by positioning the edges of the front plate 64 within the cavity formed by the back plate 62, after connecting the wiring 68B to the writing 68A for providing power to the lighting unit within the aesthetic element assembly 60.

In both examples of FIGS. 22 and 23, the aesthetic element assembly 60 may be used with any type of concrete structure 20. The specific use of which example may vary based on the design and intended use of the system 10. For example. It may be possible to have a single back plate 62 formed within a concrete structure 20 which has a shape that can mate up to various different front plate 64 and aesthetic elements 30. For example, a rectangular shaped back plate 62 may be used with many different front plates 64 which all have a corresponding rectangular shape. In another example, it may be desirable to have a concrete structure 20 where the aesthetic element assembly 60 can be interchangeably adjusted in full, such as where a user owns numerous different aesthetic element assemblies 60 and each is mountable to the concrete structure 20.

It is noted that the aesthetic element assembly 60, including the back plate 62, the front plate 64, and the aesthetic element 30 can be made with a 3D printing process, or another technique, such as molding. It may be preferable to use polyethylene glycol (PEG), polyethylene terephthalate (PETG), and/or an alternative additive plastic due to its ability to protect against degradation from UV rays and environmental conditions, but other plastic materials are also envisioned, including ABS, PVC, PET, etc. With a 3D printed part, it may be possible to use a chemical or epoxy which can aid with smoothing printing lines or surface textures to provide a smooth surface texture on the aesthetic element 30. With any components of the aesthetic element assembly 60, the various components may connect together through friction or snap fit designs, or where adhesives or sealants are used. For instance, in one example, it may be possible to use a waterproof sealant such as a silicone-based adhesive to hold the front plate 64 to the back plate 62, or to hold the aesthetic element 30 to the front plate 64. The silicone-based adhesive may be removable, and it may prevent the infiltration of moisture, insects, or other substances.

When the back plate 62 is formed within the concrete structure 20, a final assembly of the aesthetic element assembly 60 with the concrete structure 20 may be such that the back plate 62 is flush with, or inset to, the edge of the concrete structure 20. This allows for proper finishing of the surface of the concrete structure 20 without causing damage to the back plate 62 and without the back plate 62 interfering with the concrete surface finishing. For example, it may be desired by many to have a sanded, polished, or otherwise finished surface on the concrete structure 20, which may require numerous rounds of sanding with different grit sandpaper. Having the back plate 62 flush or inset ensures a worker can finish the eternity of the concrete structure 20 to the desired appearance without causing damage to the back plate 62, or any other parts of the aesthetic element assembly 60.

Figure 24:
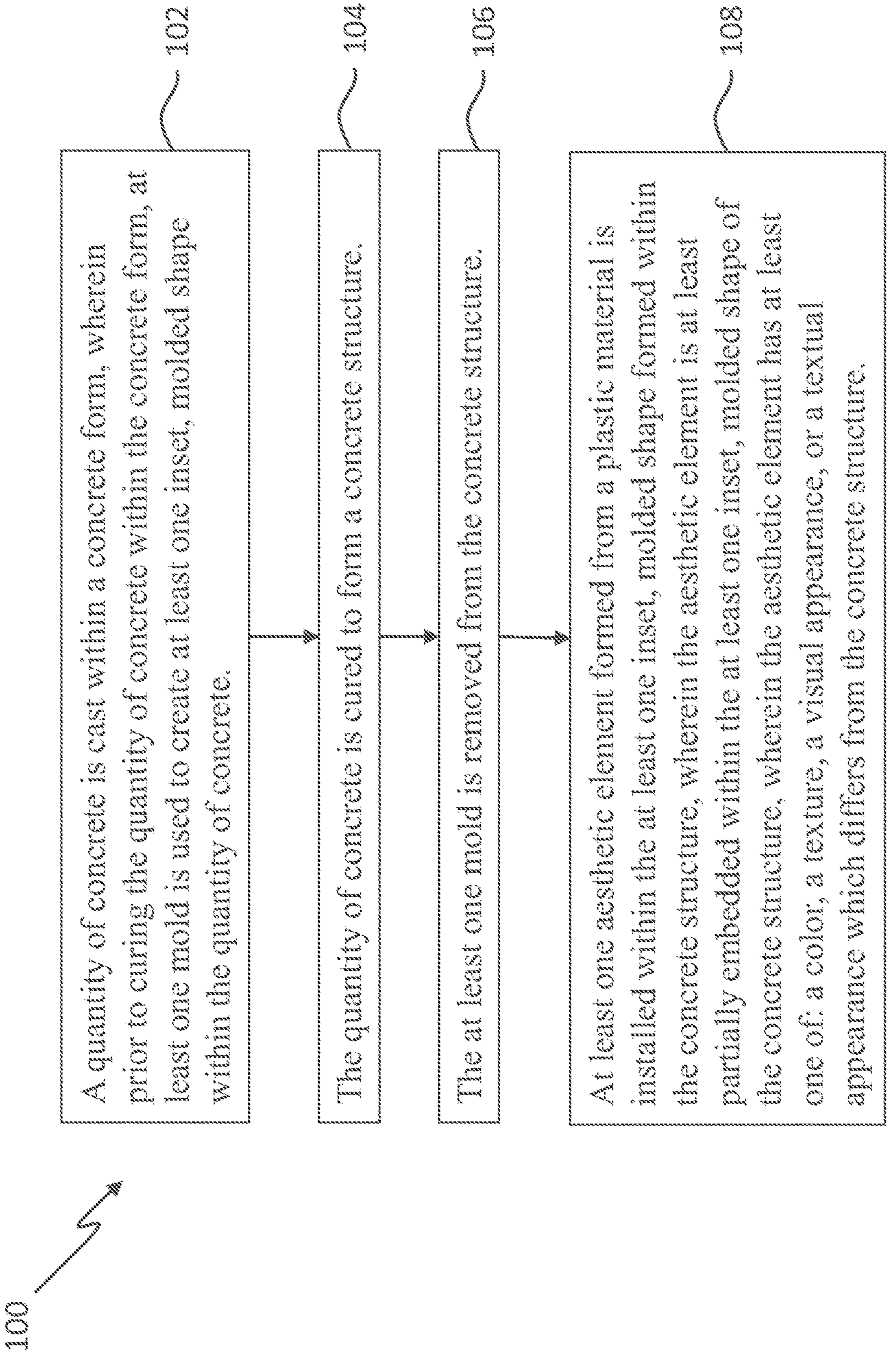
FIG. 24 is a flowchart illustrating a method of manufacturing a concrete structure with an aesthetic element, in accordance with the first exemplary embodiment of the disclosure.

FIG. 24 is a flowchart 100 illustrating a method of manufacturing a concrete structure with an aesthetic element, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a quantity of concrete is cast within a concrete form, wherein prior to curing the quantity of concrete within the concrete form, at least one mold is used to create at least one inset, molded shape within the quantity of concrete. The quantity of concrete is cured to form a concrete structure (block 104). The at least one mold is removed from the concrete structure (block 106). At least one aesthetic element formed from a plastic material is installed within the at least one inset, molded shape formed within the concrete structure, wherein the aesthetic element is at least partially embedded within the at least one inset, molded shape of the concrete structure, wherein the aesthetic element has at least one of: a color, a texture, a visual appearance, or a textual appearance which differs from the concrete structure (block 108). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for embedded concrete with an aesthetic element, the system comprising:

a concrete structure having at least two molded shapes and at least one raised area having a surface, the at least one raised area positioned between the at least two molded shapes;

at least two aesthetic elements formed from a plastic material, each of the at least two aesthetic elements at least partially embedded within each of the at least two molded shapes of the concrete structure, respectively, wherein one of the at least two aesthetic elements has at least one of: a color, a texture, a lighting, a visual appearance, or a textual appearance which differs from the concrete structure; and at least one fastening device connected between each aesthetic element of the at least two aesthetic elements and the concrete structure, wherein the at least one fastening device further comprises one or more of:

a threaded fastener extending beyond a rear face of the at least two aesthetic elements and into the concrete structure;

a dowel which extends from the at least two aesthetic elements;

an adhesive which is positioned between the rear face of the at least two aesthetic elements and the concrete structure; or an anchor cast into the concrete structure prior to curing.

2. The system of claim 1, wherein the at least two aesthetic elements are formed from a 3D printing process.

3. The system of claim 1, wherein the at least one of the color, the texture, the visual appearance, or the textual appearance appears on an exterior surface of the at least two aesthetic elements, wherein the exterior surface of one of the at least two aesthetic elements are substantially even with the surface of the at least one raised area of the concrete structure.

4. The system of claim 1, wherein the at least one of the color, the texture, the visual appearance, or the textual appearance appears on an exterior surface of the at least two aesthetic elements, wherein the exterior surface of one of the at least two aesthetic elements are negatively inset from the surface of the at least one raised area of the concrete structure.

5. The system of claim 1, wherein the at least one of the color, the texture, the visual appearance, or the textual appearance appears on an exterior surface of the at least two aesthetic elements, wherein the exterior surface of the at least two aesthetic elements are positioned positively offset from the surface of the at least one raised area of the concrete structure.

6. The system of claim 1, wherein the at least two aesthetic elements have a tapered sidewall, wherein the tapered sidewall contacts a sidewall of the molded shape within the concrete structure.

7. The system of claim 1, wherein the at least two aesthetic elements comprise a vehicular or pedestrian directional traffic sign.

8. The system of claim 1, further comprising at least one lighting device formed at least partially on or within one or both of the concrete structure or one of the at least two aesthetic elements.

9. A system for embedded concrete with an aesthetic element, the system comprising:

a concrete structure having a plurality of molded shapes and a plurality of raised concrete areas, each raised concrete area of the plurality of raised concrete areas having a surface, wherein at least one of the plurality of raised concrete areas is positioned between at least two of the plurality of molded shapes and the plurality of molded shapes is positioned inset from the at least one surface of the plurality of raised concrete areas, extending into the concrete structure;

at least two aesthetic elements formed from a plastic material, a first of the at least two aesthetic elements at least partially embedded within one of the plurality of molded shapes in the concrete structure, and a second of the at least two aesthetic elements positioned on the at least one surface of the concrete structure, whereby the second of the at least two aesthetic elements is positioned outermost from the first of the at least two aesthetic elements, wherein both of the first and second aesthetic elements have at least one of: a color, a texture, a visual appearance, or a textual appearance which differs from the concrete structure; and at least one fastening device connected between each of the first and second aesthetic elements, respectively, and the concrete structure.

10. A system for embedded concrete with an aesthetic element, the system comprising:

a concrete structure having at least two molded shapes and at least one raised area having a surface, the at least one raised area positioned between the at least two molded shapes;

at least two aesthetic elements formed from a plastic material, each of the at least two aesthetic elements at least partially embedded within each of the at least two molded shapes of the concrete structure, respectively, wherein one of the at least two aesthetic elements has at least one of: a color, a texture, a lighting, a visual appearance, or a textual appearance which differs from the concrete structure;

at least one fastening device connected between each aesthetic element of the at least two aesthetic elements and the concrete structure; and at least one lighting device formed at least partially on or within one or both of the concrete structure or one of the at least two aesthetic elements.

* * * * *